United States Patent
Hattori

(10) Patent No.: US 11,405,598 B2
(45) Date of Patent: Aug. 2, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Mitsuaki Hattori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/318,657

(22) Filed: May 12, 2021

(65) Prior Publication Data
US 2021/0360213 A1   Nov. 18, 2021

(30) Foreign Application Priority Data
May 18, 2020   (JP) .............................. JP2020-086873

(51) Int. Cl.
*H04N 9/73*     (2006.01)
*G06V 20/20*    (2022.01)

(52) U.S. Cl.
CPC ............ *H04N 9/735* (2013.01); *G06V 20/20* (2022.01)

(58) Field of Classification Search
CPC ........ H04N 9/73; H04N 9/735; H04N 1/6077; H04N 1/608; H04N 1/6083; H04N 1/6086; H04N 5/23218; H04N 5/23219
USPC ...................................................... 348/223.1
See application file for complete search history.

(56) References Cited

U.S. PATENT DOCUMENTS

| | | | | |
|---|---|---|---|---|
| 8,830,348 B2 * | 9/2014 | Nomura | ................. | H04N 9/735 348/224.1 |
| 2009/0021602 A1 * | 1/2009 | Fujiwara | ................. | H04N 9/735 348/E9.051 |
| 2021/0058533 A1 * | 2/2021 | Aggarwal | .............. | G06V 10/82 |
| 2021/0144352 A1 * | 5/2021 | Kim | .................... | H04N 5/23206 |
| 2021/0278961 A1 * | 9/2021 | Brown | ................ | G06F 3/04842 |

FOREIGN PATENT DOCUMENTS

JP      2010-187201 A      8/2010

\* cited by examiner

*Primary Examiner* — Anthony J Daniels
(74) *Attorney, Agent, or Firm* — Canon U.S.A., Inc. IP Division

(57) ABSTRACT

An image processing apparatus includes a detection unit configured to detect two or more specific objects from a captured image, a first color estimation unit configured to estimate a first light source color from color information about a first specific object among the detected specific objects, a second color estimation unit configured to estimate a second light source color from color information about a second specific object among the detected specific objects, a third color estimation unit configured to estimate a third light source color from color information about an area including other than the detected specific objects, and a calculation unit configured to calculate a white balance correction value to be applied to the captured image by assigning a weight to at least one of the first, second, and third light source colors based on degrees of similarity between the first, second, and third light source colors.

13 Claims, 9 Drawing Sheets

FIG.8

| DEGREES OF SIMILARITY | | | DEGREES OF RELIABILITY | | |
|---|---|---|---|---|---|
| FIRST ESTIMATED LIGHT SOURCE COLOR | SECOND ESTIMATED LIGHT SOURCE COLOR | THIRD ESTIMATED LIGHT SOURCE COLOR | FIRST ESTIMATED LIGHT SOURCE COLOR | SECOND ESTIMATED LIGHT SOURCE COLOR | THIRD ESTIMATED LIGHT SOURCE COLOR |
| HIGH | HIGH | HIGH | HIGH | HIGH | HIGH |
| HIGH | HIGH | LOW | HIGH | HIGH | LOW |
| HIGH | LOW | HIGH | HIGH | LOW | HIGH |
| LOW | HIGH | HIGH | LOW | HIGH | HIGH |
| LOW | LOW | LOW | NEUTRAL | NEUTRAL | NEUTRAL |

FIG.9

| DEGREE OF RELIABILITY IN PAST FRAME | DEGREE OF RELIABILITY IN LATEST FRAME | RECALCULATED DEGREE OF RELIABILITY | LIGHT SOURCE COLOR DATA TO BE USED |
|---|---|---|---|
| HIGH | HIGH | HIGH | LATEST FRAME |
| HIGH | NEUTRAL | HIGH | PAST FRAME |
| HIGH | LOW | LOW | LATEST FRAME |
| NEUTRAL | HIGH | HIGH | LATEST FRAME |
| NEUTRAL | NEUTRAL | NEUTRAL | LATEST FRAME |
| NEUTRAL | LOW | LOW | LATEST FRAME |
| LOW | HIGH | HIGH | LATEST FRAME |
| LOW | NEUTRAL | LOW | PAST FRAME |
| LOW | LOW | LOW | LATEST FRAME |

IMAGE PROCESSING APPARATUS, IMAGE PROCESSING METHOD, AND STORAGE MEDIUM

BACKGROUND

Field of the Disclosure

The present disclosure relates to an image processing technique for adjusting white balance of an image.

Description of the Related Art

As an automatic white balance technique for an image processing apparatus, Japanese Patent Application Laid-Open No. 2010-187201 discusses a technique for detecting a specific object by face detection, estimating a light source by using color information about the detected area, and calculating a white balance correction value. Deep learning techniques have been paving ways to detection of various non-face objects such as skin and natural plants in recent years, and information available for white balance calculation is ever increasing.

However, while deep learning techniques enable the detection of various objects, objects other than intended ones can be erroneously detected. An incorrect correction value is calculated if white balance is calculated based on such an erroneous detection result.

SUMMARY

According to embodiments of the present disclosure, an image processing apparatus includes a detection unit configured to detect two or more specific objects from a captured image, a first color estimation unit configured to estimate a first light source color from color information about a first specific object among the detected specific objects, a second color estimation unit configured to estimate a second light source color from color information about a second specific object among the detected specific objects, a third color estimation unit configured to estimate a third light source color from color information about an area including other than the detected specific objects, and a calculation unit configured to calculate a white balance correction value to be applied to the captured image by assigning a weight to at least one of the first, second, and third light source colors based on degrees of similarity between the first, second, and third light source colors.

Further features of the present disclosure will become apparent from the following description of exemplary embodiments with reference to the attached drawings.

BRIEF DESCRIPTION OF THE DRAWINGS

FIG. 8 is a chart illustrating the degrees of similarity and the degrees of reliability of estimated light source colors in a table form.

FIG. 9 is a diagram used to describe recalculation of the degrees of reliability and the estimated light source colors.

DESCRIPTION OF THE EMBODIMENTS

Figure 1:
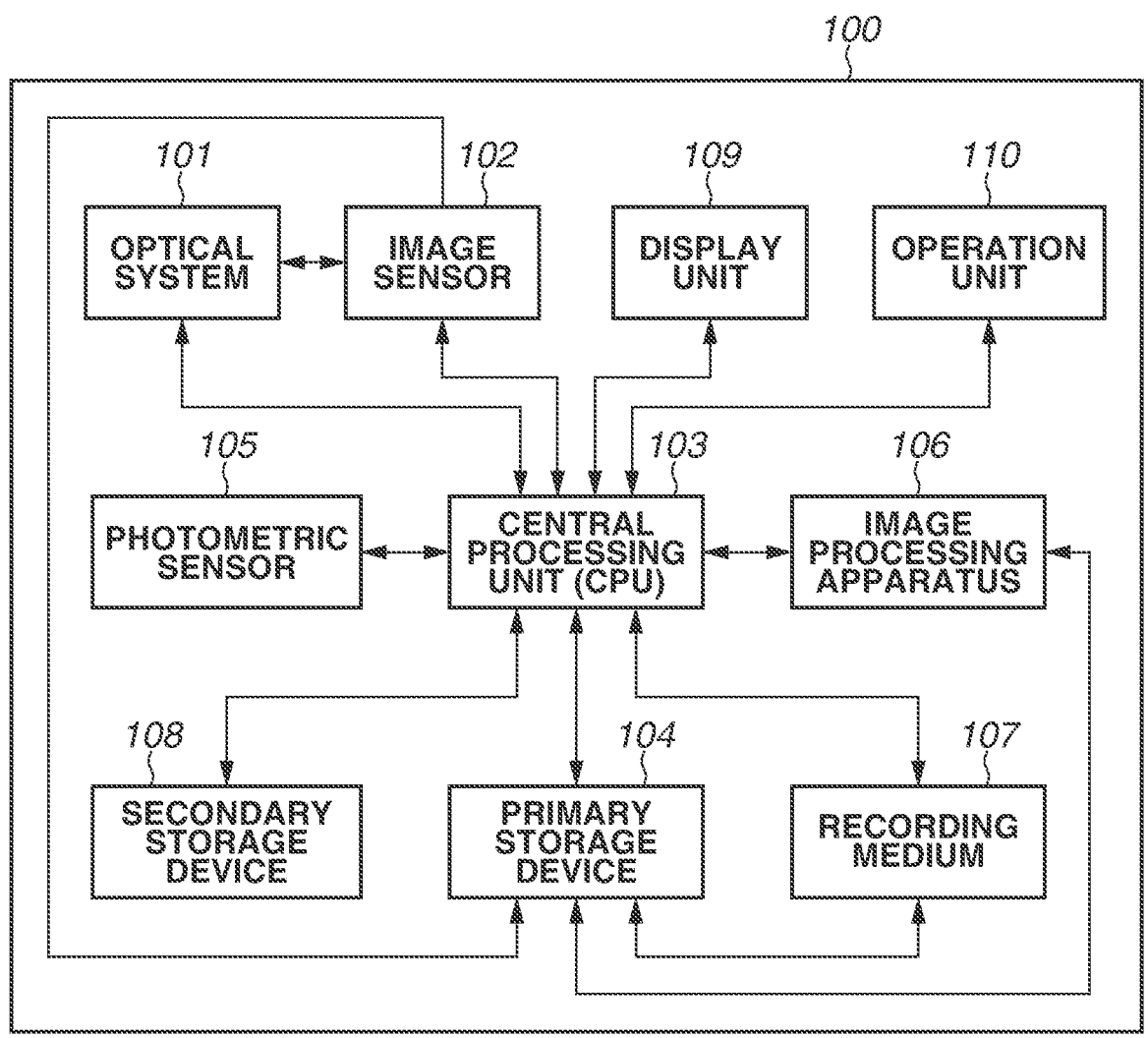
FIG. 1 is a diagram illustrating a configuration example of an imaging apparatus including an image processing apparatus.

Exemplary embodiments of the present disclosure will be described below with reference to the drawings. Note that the following exemplary embodiments are not intended to limit the present disclosure, and all the combinations of features described in some exemplary embodiments are not necessarily indispensable to the present disclosure. Similar components will be described with the same reference numerals.

FIG. 1 is a diagram illustrating a schematic configuration of an imaging apparatus 100 that is an application example of an image processing apparatus according to the present exemplary embodiment.

The imaging apparatus 100 is a camera such as a digital camera and a digital video camera. The imaging apparatus 100 may be an electronic device having a camera function, such as a mobile phone having a camera function or a computer with a built-in camera.

An optical system 101 includes a lens, a shutter, and a diaphragm. The optical system 101 forms an optical image of an object on an imaging plane of an image sensor 102. Information including a focal length, a shutter speed, and an aperture value is transmitted from the optical system 101 to a central processing unit (CPU) 103. The image sensor 102 is a charge-coupled device (CCD) image sensor or a complementary metal-oxide-semiconductor (CMOS) image senor. The image sensor 102 includes a red (R)-green (G)-blue (B) Bayer array, and converts the optical image formed by the optical system 101 into pixel-by-pixel luminance information. Data digitized through a non-illustrated analog-to-digital (AD) converter, i.e., raw data before development processing is stored into a primary storage device 104 via the CPU 103. An electrical gain (hereinafter, referred to as an International Organization for Standardization (ISO) speed) of the image sensor 102 is set by the CPU 103.

A photometric sensor 105 is divided into a plurality of photometric areas (for example, horizontally divided into 12 areas and vertically 8 areas, a total of 96 areas), and detects object luminance in each divided area from the amount of light incident through the optical system 101. Luminance signals of the respective photometric areas output from the photometric sensor 105 are digitized by a non-illustrated AD converter and transmitted to the CPU 103. The number of divided areas may be any positive whole number and is not limited to 96 described above.

The CPU 103 functioning as a control unit implements functions of the imaging apparatus 100 by controlling the components of the imaging apparatus 100 based on input data and previously stored programs. In the following description, at least some of the functions for the CPU 103 to implement by executing the programs may be implemented by a dedicated piece of hardware such as an application specific integrated circuit (ASIC).

The primary storage device 104 is a volatile storage device such as a random access memory (RAM), and used for operation of the CPU 103. Information stored in the primary storage device 104 can also be used by an image processing apparatus 106 or recorded on a recording medium 107.

A secondary storage device 108 is a nonvolatile storage device such as an electrically erasable programmable read-only memory (EEPROM). The secondary storage device 108 stores a program (firmware) and various types of setting information for controlling the imaging apparatus 100. The program and various types of setting information stored in the secondary storage device 108 is used by the CPU 103.

The recording medium 107 records data on images captured by the image sensor 102 and temporarily stored in the primary storage device 104. Like a semiconductor memory card, the recording medium 107 is detachable from the imaging apparatus 100, and the data recorded on the recording medium 107 can be read by other devices such as a personal computer. In other words, the imaging apparatus 100 includes a detachable mechanism and reading and writing functions for the recording medium 107.

A display unit 109 displays a viewfinder image during imaging, captured images, and a graphical user interface (GUI) image for interactive operations.

An operation unit 110 is an input device group for accepting a user's operations and transmitting the operations to the CPU 103 as operation input information. Examples of the input devices include a button, a lever, and a touch panel. The operation unit 110 may include an input device using voice or a line of sight. A release button from which the imaging apparatus 100 obtains a user operation to start imaging is also included in the operation unit 110. The imaging apparatus 100 according to the present exemplary embodiment has a plurality of patterns of image processing for the image processing apparatus 106 to apply to a captured image. Such patterns can be set as imaging modes by using the operation unit 110.

The image processing apparatus 106 applies various types of image processing to image data obtained by the imaging using the image sensor 102. The image processing includes development processing such as white balance processing, color interpolation processing, gamma correction processing, saturation correction processing, and hue correction processing. The color interpolation processing is intended to convert an RGB Bayer array signal into R. G, and B, three color-specific plane signals. As will be described in detail below, the image processing apparatus 106 performs processing for detecting two or more specific object areas from a captured image, specific object area color determination processing, light source color estimation processing, light source color similarity and reliability degree calculation processing, light source color mixing processing, and processing for calculating white balance correction values. At least some of such processes of the image processing apparatus 106 may be implemented by software by the CPU 103 executing a program according to the present exemplary embodiment.

Various types of calculation processing and control processing related to a white balance correction according to the present exemplary embodiment will now be described.

Figure 2:
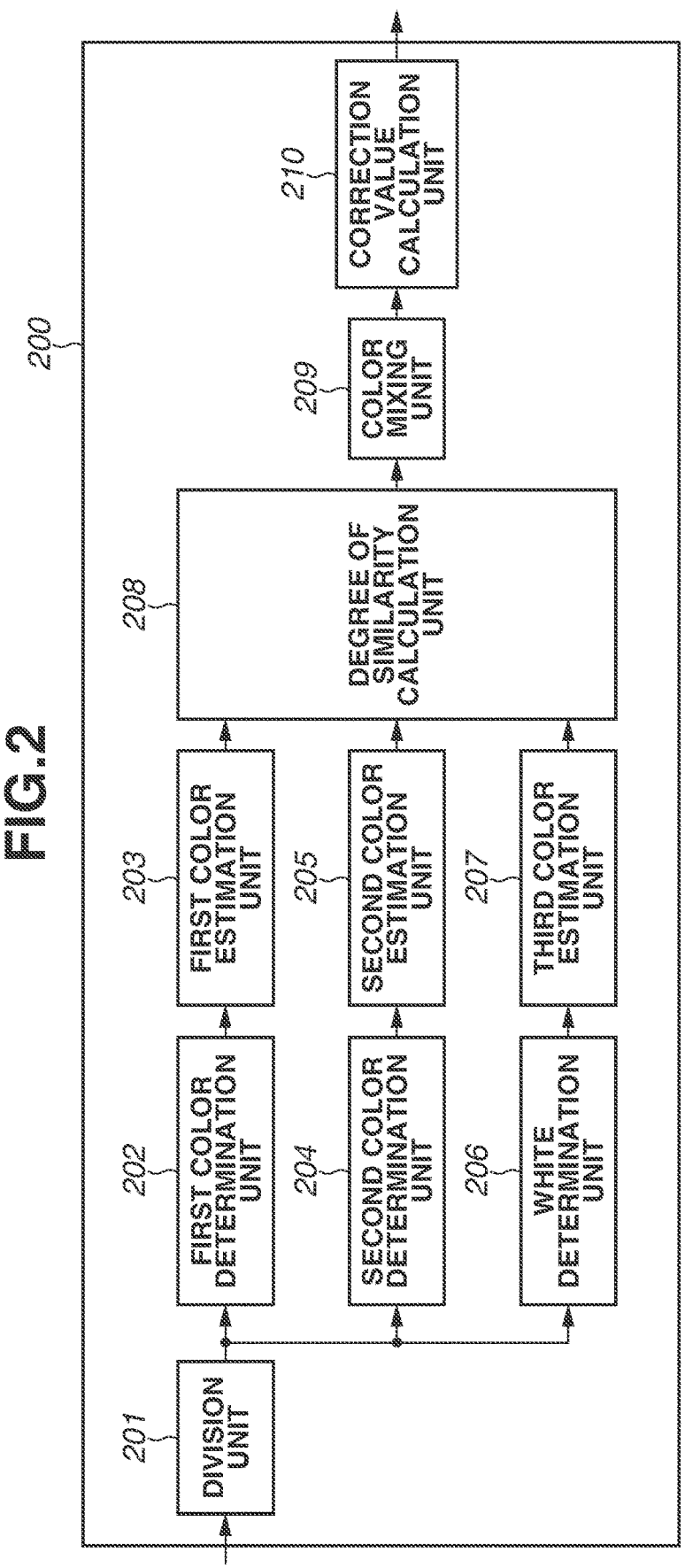
FIG. 2 is a diagram illustrating a configuration example of the image processing apparatus.

FIG. 2 is a block diagram illustrating the functions of a white balance control unit 200 that performs the white balance processing in the image processing apparatus 106. In the following description, white balance will be abbreviated as WB. The WB control unit 200 includes a division unit 201, a first color determination unit 202, a first color estimation unit 203, a second color determination unit 204, a second color estimation unit 205, a white determination unit 206, a third color estimation unit 207, a degree of similarity calculation unit 208, a color mixing unit 209, and a correction value calculation unit 210.

The division unit 201 divides a captured image captured by the image sensor 102 and temporarily stored in the primary storage device 104 into a plurality of blocks. Details of the block division processing by the division unit 201 will be described below.

The first color determination unit 202 and the second color determination unit 204 detect respective specific objects from the captured image. In the present exemplary embodiment, for example, a human skin area of a human figure will be discussed as a first specific object, and a natural plant area as a second specific object. The first color determination unit 202 and the second color determination unit 204 then obtain color information about the respective detected specific objects. More specifically, the first color determination unit 202 detects a first specific object from the captured image, and obtains color information about the specific object. The second color determination unit 204 detects a second specific object from the captured image, and obtains color information about the specific object. In the present exemplary embodiment, if a human skin area of a human figure is detected as the first specific object, the color information about the first specific object is skin color information about the human skin. If a natural plant is detected as the second specific object, the color information about the second specific object is green information about the plant. Details of the processing for obtaining the color information from the areas of the specific objects detected by the first color determination unit 202 and the second color determination unit 204 will be described below.

The white determination unit 206 obtains color information about an area including other than the areas of the specific objects (specific object areas) from the captured image. More specifically, the white determination unit 206 obtains color information about an area including other than the two or more specific objects detected by the first color determination unit 202 and the second color determination unit 204. As will be described in detail below, in the present exemplary embodiment, the white determination unit 206 obtains white information from the area including other than the specific object areas.

The first color estimation unit 203 estimates a first light source color based on the color information about the first specific object detected by the first color determination unit 202. The estimated first light source color will hereinafter be referred to as a first estimated light source color.

The second color estimation unit 205 estimates a second light source color based on the color information about the second specific object detected by the second color determination unit 204. The estimated second light source color will hereinafter be referred to as a second estimated light source color.

The third color estimation unit 207 estimates a third light source color based on the color obtained by the white determination unit 206, i.e., the white information about the area including other than specific object areas of the captured image. The estimated third light source color will hereinafter be referred to as a third estimated light source color.

Details of the processing by the first, second, and third color estimation units 203, 205, and 207 will be described below.

The degree of similarity calculation unit 208 calculates degrees of similarity between the first, second, and third light source colors, and calculates the degrees of reliability of the respective first, second, and third light source colors from the degrees of similarity.

The color mixing unit 209 performs color mixing processing for assigning weights to the respective first, second, and third light source colors and mixing the weighted light source colors based on the degrees of similarity or the degrees of reliability calculated from the degrees of similarity.

The correction value calculation unit 210 calculates WB correction values to be applied to the captured image based on a light source color resulting from the color mixing processing by the color mixing unit 209.

In other words, in the present exemplary embodiment, the degrees of similarity between the first to third light source colors are calculated, and the degrees of reliability of the first to third light source colors are further calculated from the degrees of similarity. The WB correction values are calculated by assigning weights to the first to third light source colors based on the degrees of reliability. Details of the processing by the degree of similarity calculation unit 208, the color mixing unit 209, and the correction value calculation unit 210 will be described below. The image processing apparatus 106 then performs the WB processing using the WB correction values.

Figure 3:
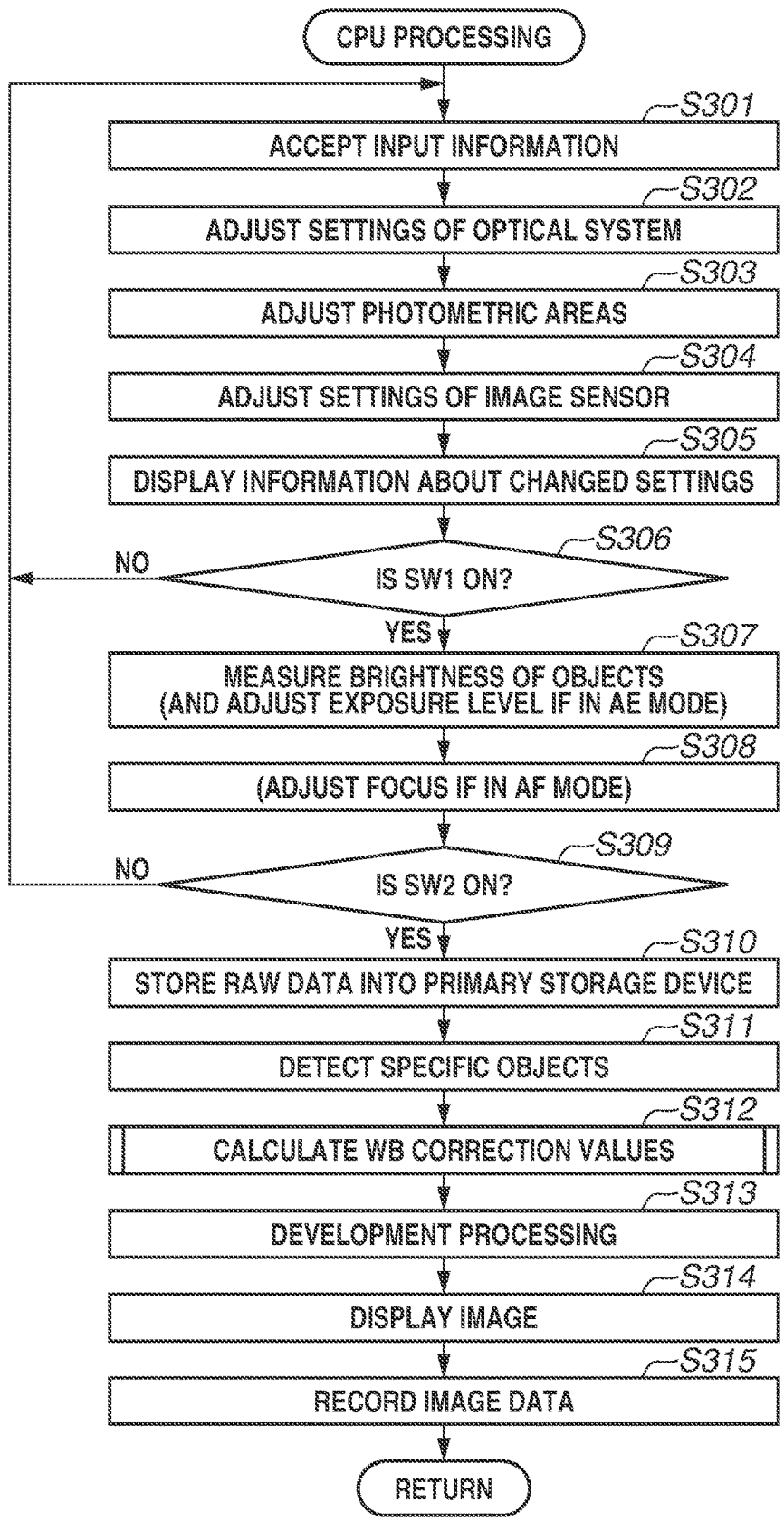
FIG. 3 is a flowchart of processing to be performed by a central processing unit (CPU) of the imaging apparatus.

FIG. 3 is a flowchart related to the processing by the CPU 103 of the imaging apparatus 100. In the present exemplary embodiment, the release button is a two-level button. In the following description, SW1 of the operation unit 110 refers to half-pressing of the release button, and SW2 of the operation unit 110 refers to full-pressing of the release button.

In step S301, the CPU 103 accepts input information from the user via the operation unit 110.

In step S302, the CPU 103 adjusts settings of the optical system 101, such as the focal length, shutter speed, and aperture value, based on the input information from the user.

In step S303, the CPU 103 adjusts the photometric areas of the photometric sensor 105 based on the input information from the user.

In step S304, the CPU 103 adjusts settings of the image sensor 102, such as the ISO speed, based on the input information from the user.

In step S305, the CPU 103 displays information about the settings changed by the processing of steps S302 to S304 on the display unit 109, and thereby presents the information to the user.

The order of steps S301 to S305 is not limited thereto, and may be freely changed depending on the processing.

In step S306, the CPU 103 determines whether there is SW1 input from release button (whether SW1 is on or off). The CPU 103 repeats the operation of steps S301 to S305 unless SW1 is input from the release button (NO in step S306). On the other hand, if SW1 is input from the release button (SW1 is on) (YES in step S306), the processing proceeds to step S307.

In step S307, the CPU 103 measures the brightness of the objects based on the output from the photometric sensor 105. If the imaging apparatus 100 is set to an automatic exposure (AE) mode, the CPU 103 automatically adjusts the exposure level based on the shutter speed, the aperture value, and the ISO speed.

In step S308, if the imaging apparatus 100 is set to an automatic focus (AF) mode, the CPU 103 adjusts focus by controlling a focus lens of the optical system 101 based on information from a non-illustrated distance measurement sensor.

The order of steps S307 and S308 is not limited thereto, and may be freely changed depending on the processing.

In step S309, the CPU 103 determines whether there is SW2 input from the release button (SW2 is on or off). The CPU 103 repeats the operation of steps S301 to S308 unless SW2 is input from the release button (NO in step S309). On the other hand, if SW2 is input from the release button (SW2 is on) (YES in step S309), the processing proceeds to step S310.

In step S310, the CPU 103 causes the image sensor 102 to perform exposure, and stores raw data obtained by A/D-converting an imaging signal of the image sensor 102 into the primary storage device 104.

In step S311, the image processing apparatus 106 detects specific objects from the data stored in the primary storage device 104 under the control of the CPU 103. As an example, the present exemplary embodiment deals with a case where human skin is detected as a first specific object and a natural green as a second specific object. The specific objects to be detected are not limited thereto, and any specific objects of which original color can be estimated can be used. Examples include a face, a blue sky, a cloud, ground, a tree trunk, asphalt pavement, an autumn leaf, and a dead leaf. While the present exemplary embodiment deals with a case of detecting two specific objects, three or more specific objects may be detected. The method for detecting the specific objects may use rule-based techniques as well as deep learning techniques.

In step S312, the image processing apparatus 106 calculates the WB correction values based on the data stored in the primary storage device 104 under the control of the CPU 103. Details of the processing will be described below.

In step S313, the image processing apparatus 106 performs development processing on the raw data stored in the primary storage device 104 by using the WB correction values calculated in step S312, under the control of the CPU 103.

In step S314, the CPU 103 displays an image based on the image data obtained by the development processing, on the display unit 109.

In step S315, the CPU 103 records the image data obtained by the development processing in the recording medium 107.

Details of the calculation of the WB correction values by the image processing apparatus 106 in step S312 will now be described.

Figure 4:
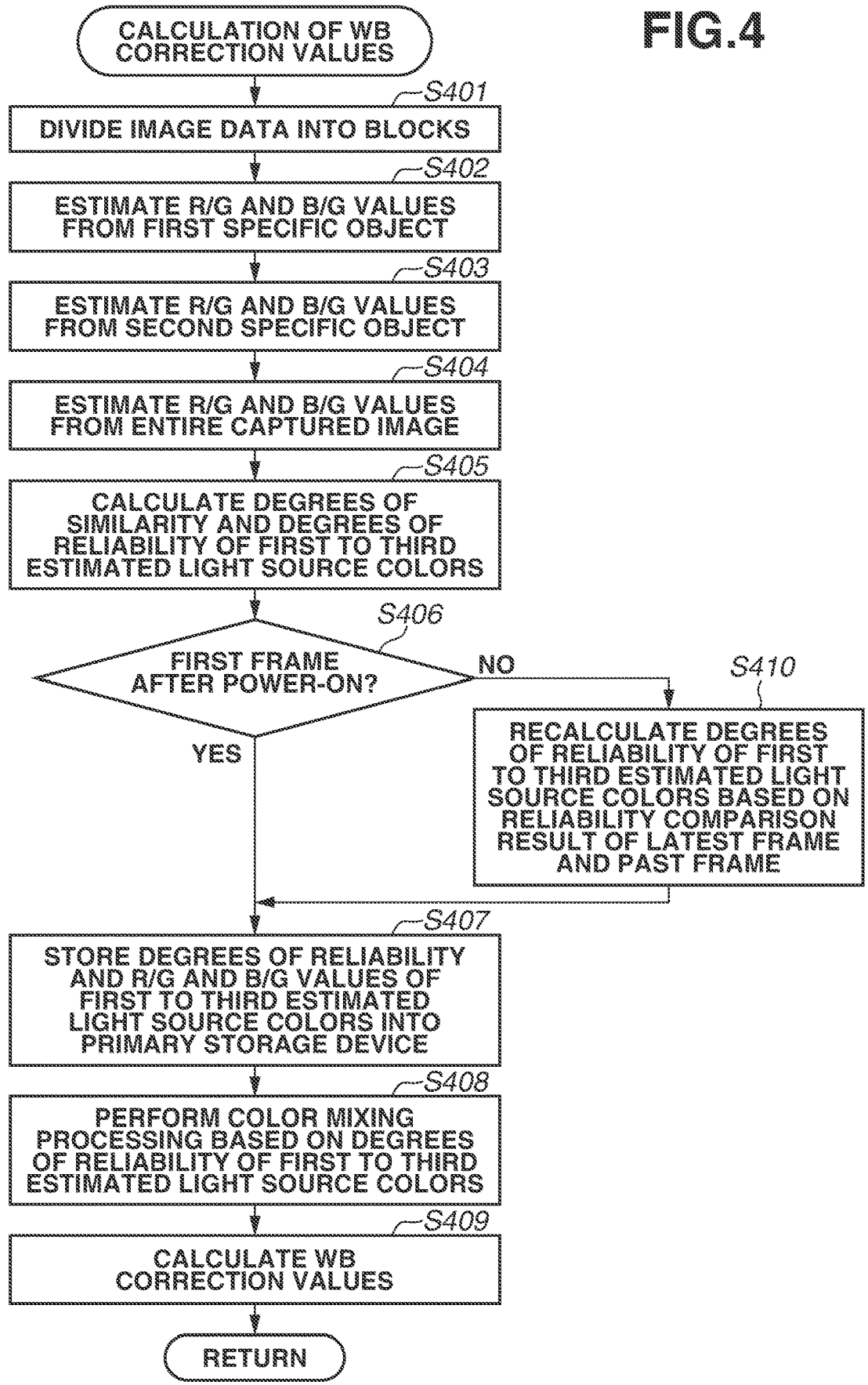
FIG. 4 is a flowchart of white balance correction value calculation processing.

FIG. 4 is a flowchart of the WB correction value calculation processing performed by the functional units of the image processing apparatus 106 illustrated in FIG. 2.

Figure 5:
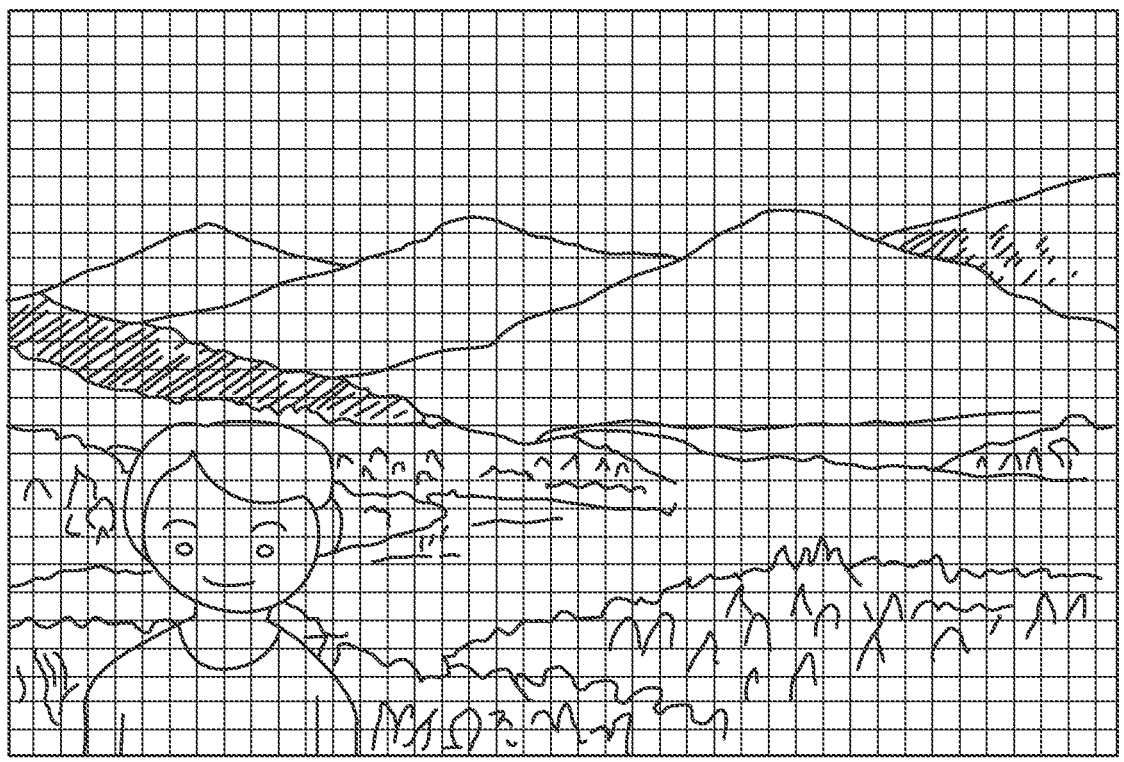
FIG. 5 is a diagram used to describe division of an image into blocks.

In step S401, the division unit 201 divides the image data stored in the primary storage device 104 into given numbers of blocks horizontally and vertically as illustrated in FIG. 5, for example. The division unit 201 calculates R, G. and B integral values in each block.

In step S402, the first color determination unit 202 detects a first specific object area by specific object detection processing, and calculates only the R. G, and B integral values of the blocks in the first specific object area. In the present exemplary embodiment, a human skin area is detected as the first specific object area, and the R, G, and B integral values in the human skin area are calculated. The first color determination unit 202 further calculates an R/G value and a B/G value from the R, G, and B integral values.

The first color estimation unit 203 then estimates the R/G and B/G values of the light source color from the R/G and B/G values corresponding to the human skin area, calculated by the first color determination unit 202.

A method for estimating the R/G and B/G values of the light source color from the R/G and B/G values corresponding to the human skin area will now be described.

Figure 6A:
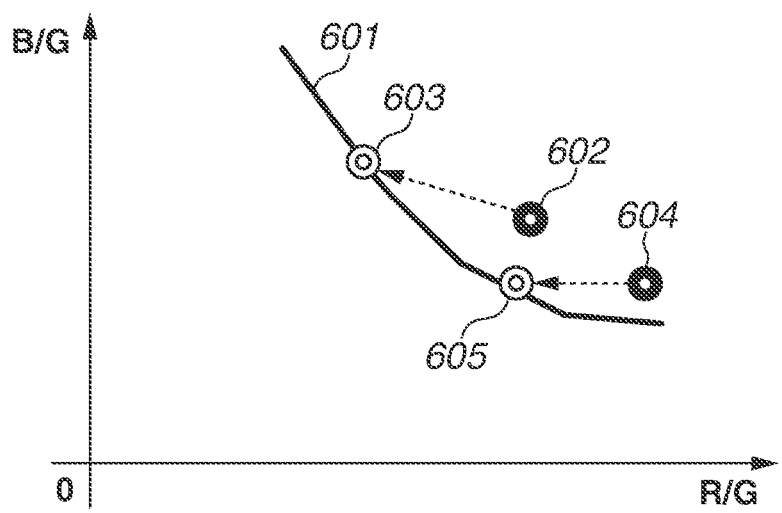
FIGS. 6A to 6C are graphs used to describe red/green (R/G) and blue/green (B/G) values and a black-body radiation locus.

FIG. 6A is a graph of the R/G and B/G values. The horizontal axis indicates the R/G value, and the vertical axis the B/G value. The solid line in the graph represents a black-body radiation locus 601.

In the present exemplary embodiment, the secondary storage device 108 stores a correspondence table of various types of light source colors and the R/G and B/G values of human skin under the respective types of light sources in advance. While the color of actual human skin varies from one person to another, the correspondence table is generated with skin color near the center of such variations as a representative value.

In FIG. 6A, suppose, for example, that the R/G and B/G values corresponding to the human skin area fall on the position of a circle 602. In such a case, the light source color corresponding to the color of the human skin area obtained from the correspondence table is located at the position of a circle 603. Similarly, if, for example, the R/G and B/G values corresponding to the human skin area fall on the position of a circle 604, the light source color corresponding to the color of the human skin area obtained from the corresponding table is located at the position of a circle 605. In such a manner, the first color estimation unit 203 estimates the light source color from the color of the human skin area by using the R/G and B/G values of the human skin area calculated by the first color determination unit 202 and the corresponding table. In the present exemplary embodiment, the light source color estimated by the first color estimation unit 203 is the first estimated light source color.

In step S403, the second color determination unit 204 detects a second specific object area by specific object detection processing, and calculates only the R, G, and B integral values of the blocks in the second specific object area. In the present exemplary embodiment, a natural green area is detected as the second specific object area, and the R, G, and B integral values of the natural green area are calculated. The second color determination unit 204 also calculates R/G and B/G values from the R, G. and B integral values.

The second color estimation unit 205 then estimates the R/G and B/G values of the light source color from the R/G and B/G values corresponding to the natural green area, calculated by the second color determination unit 204.

A method for estimating the RIG and B/G values of the light source color from the R/G and B/G values corresponding to the natural green area will now be described.

Figure 6B:
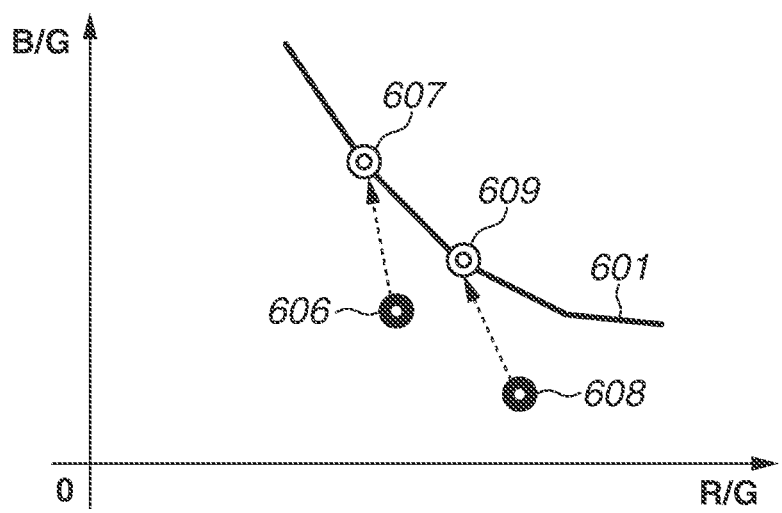

FIG. 6B is a graph of the R/G and B/G values. The horizontal axis indicates the R/G value, and the vertical axis the B/G value. The solid line in the graph represents the black-body radiation locus 601.

In the present exemplary embodiment, a corresponding table stored in the secondary storage device 108 in advance contains various types of light source colors and the R/G and B/G values of a natural green under the respective types of light sources in association with each other. While actual natural greens vary in color, the corresponding table is generated with color near the center of such variations as a representative value.

In FIG. 6B, if, for example, the R/G and B/G values corresponding to the natural green area falls on the position of a circle 606, the light source color corresponding to the color of the natural green area obtained from the corresponding table is located at the position of a circle 607. Similarly, if, for example, the R/G and B/G values corresponding to the natural green area falls on the position of a circle 608, the light source color corresponding to the color of the natural green area obtained from the corresponding table is located at the position of a circle 609. In such a manner, the second color estimation unit 205 estimates the light source color from the color of the natural green area by using the R/G and B/G values of the natural green area calculated by the second color determination unit 204 and the corresponding table. In the present exemplary embodiment, the light source color estimated by the second color estimation unit 205 is the second estimated light source color.

In step S404, the white determination unit 206 detects a white area from the entire captured image, and calculates the R. G, and B integral values in the white areas. The white determination unit 206 further calculates the R/G and B/G values of the white area from the R, G, and B integral values.

Figure 6C:
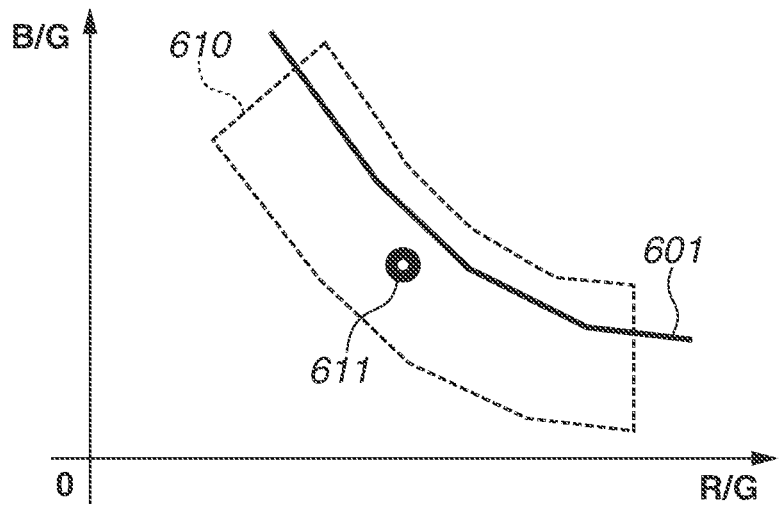

FIG. 6C is a graph of the R/G and B/G values. The horizontal axis indicates the R/G value, and the vertical axis the B/G value. The area surrounded by the dotted line in the graph represents a white area 610. The white determination unit 206 integrates the R, G. and B values of the blocks included in the white area 610 set in the R/G-B/G coordinate system illustrated in FIG. 6C, and calculates a set of R, G, and B integral values represented by a circle 611. The white area 610 illustrated in FIG. 6C is set to include the vicinity of the black-body radiation locus 601 and the light source colors of a fluorescent lamp and a mercury lamp.

The third color estimation unit 207 estimates the R/G and B/G values of the light source color from the R/G and B/G values corresponding to the white area 610 set by the white determination unit 206. The R/G and B/G values estimated by the third color estimation unit 207 indicate the light source color calculated from the entire captured image (i.e., areas including the specific object areas). In the present exemplary embodiment, the light source color estimated by the third color estimation unit 207 is the third estimated light source color.

While in the present exemplary embodiment, the white determination unit 206 applies the processing to the entire captured image, the processing of the white determination unit 206 may be applied to only the areas excluding the first and second specific object areas.

In the present exemplary embodiment, the method for estimating the light source color by extracting the blocks included in the white area 610 from the image has been described. However, other techniques for light source color estimation processing may be used as long as data on an image area including other than the first and second specific object areas is used.

In step S405, the degree of similarity calculation unit 208 calculates the degrees of similarity between the first to third estimated light source colors, and further calculates the degrees of reliability of the first to third estimated light source colors from the calculated degrees of similarity. Details will be described with reference to FIGS. 7A to 7C.

Figure 7A:
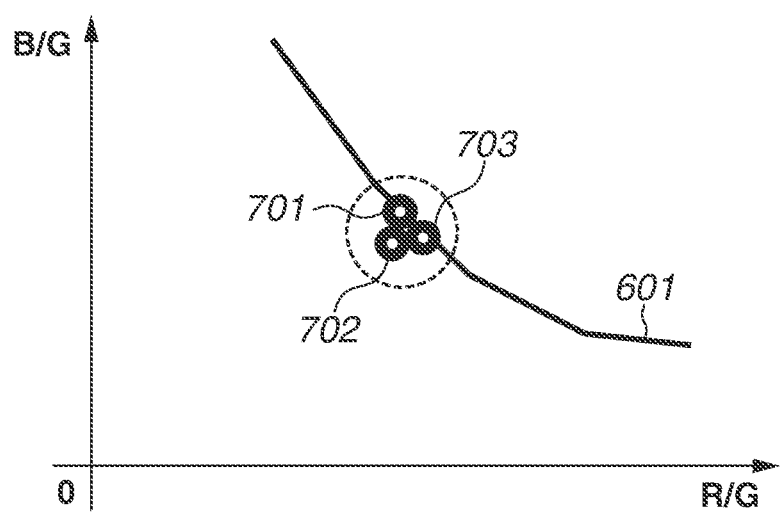
FIGS. 7A to 7C are diagrams used to describe calculation of degrees of similarity and degrees of reliability of light source colors.
Figure 7B:
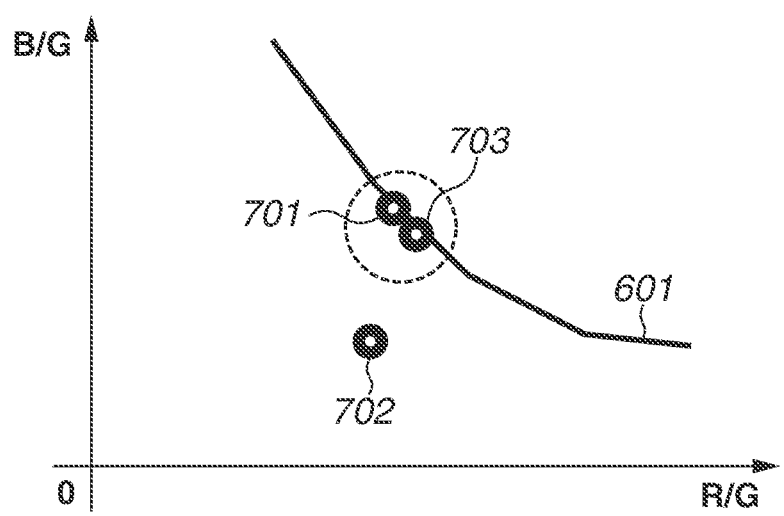
Figure 7C:
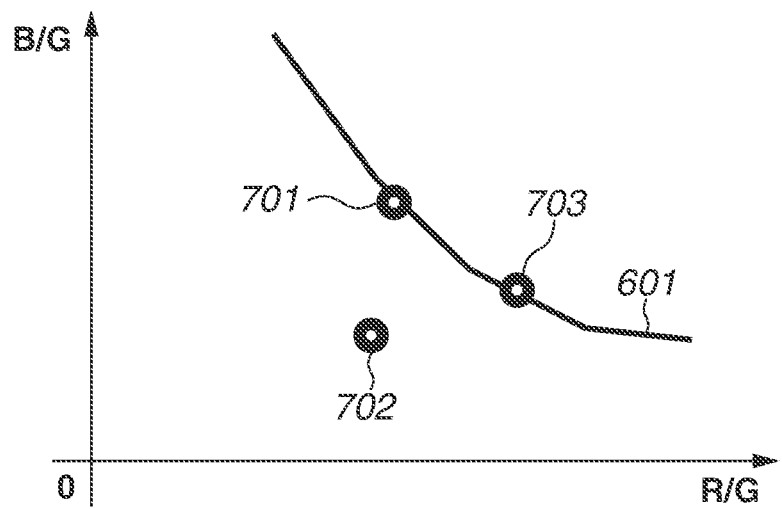

In FIGS. 7A to 7C, the solid line represents the black-body radiation locus 601. A circle 701 indicates the position of the R/G and B/G values of the foregoing first estimated light source color, a circle 702 that of the second estimated light source color, and a circle 703 that of the third estimated light source color. Here, the degree of similarity calculation unit 208 calculates the distances between the respective positions of the R/G and B/G values of the first to third estimated light source colors on the graphs.

For example, the distances can be calculated by the following Eqs. (1):

$$D12=((R/G1-R/G2)^2+(B/G1-B/G2)^2)^{(1/2)},$$

$$D13=((R/G1-R/G3)^2+(B/G1-B/G3)^2)^{(1/2)}, \text{ and}$$

$$D23=((R/G2-R/G3)^2+(B/G2-B/G3)^2)^{(1/2)} \quad \text{Eqs. (1)}$$

In Eqs. (1), D12 is the distance between the positions of the R/G and B/G values of the first and second estimated light source colors on the graph. Similarly, D13 is the distance between those of the first and third estimated light source colors, and D23 the distance between those of the second and third estimated light source colors. R/G1 and B/G1 in Eqs. (1) are the R/G and B/G values of the first estimated light source color. Similarly, R/G2 and B/G2 are the R/G and B/G values of the second estimated light source color, and R/G3 and B/G3 the R/G and B/G values of the third estimated light source color.

The degree of similarity calculation unit 208 determines that the degrees of similarity are high if the distances fall within a predetermined value. On the other hand, the degree of similarity calculation unit 208 determines that the degrees of similarity are low if the distances exceed the predetermined value. For example, if the distance D12 falls within the predetermined value, the degree of similarity calculation unit 208 determines that the degree of similarity between the first and second estimated light source colors is high. For example, if the distance D12 exceeds the predetermined value, the degree of similarity calculation unit 208 determines that the degree of similarity between the first and second estimated light source colors is low. The degree of similarity calculation unit 208 also similarly determines the degrees of similarity using the distance D13 and the distance D23. The degree of similarity calculation unit 208 then determines the degrees of reliability of the first to third estimated light source colors based on the degrees of similarity.

FIG. 7A illustrates a case where all the degrees of similarity between the first, second, and third estimated light source colors are high. In such a case, the degree of similarity calculation unit 208 determines that all the estimated light source colors have a high degree of reliability, since all the degrees of similarity between the estimated light source colors are high.

FIG. 7B illustrates an example where the degree of similarity between the first and third estimated light source colors is high while the degrees of similarity of the second estimated light source color with both the first and third estimated light source colors are low. If only one of the estimated light source colors is thus at large distances from the other two, the degree of similarity calculation unit 208 determines that the detect result of the specific object is likely to be erroneous and the one estimated light source color with low degrees of similarity (in this example, the second estimated light source color) has a low degree of reliability.

FIG. 7C illustrates an example where all the degrees of similarity between the first, second, and third estimated light source colors are low. If all the three estimated light source colors are thus at large distances, the degree of similarity calculation unit 208 determines that the degrees of reliability are neutral, since which estimated light source color has a high degree of reliability based on the estimation result is unable to be determined. The degree of similarity calculation unit 208 also determines the degrees of reliability of the first, second, and third estimated light source colors to be neutral if at least either of the first and second specific objects is not detected.

FIG. 8 is a chart illustrating a correspondence table for determining the degrees of reliability from a combination of the degrees of similarity between the first, second, and third estimated light source colors as described above. The degree of similarity calculation unit 208 determines the degrees of reliability of the estimated light source colors based on the correspondence table illustrated in FIG. 8. In the example of FIG. 7A, all the degrees of similarity of the first to third estimated light source colors in FIG. 8 are "high", and the degree of similarity calculation unit 208 determines that all the degrees of reliability of the first to third estimated light source colors are "high". In the example of FIG. 7B, the degrees of similarity of the first and third estimated light source colors are "high" and that of the second estimated light source color is "low" in FIG. 8. In such a case, the degree of similarity calculation unit 208 determines that the degrees of reliability of the first and third estimated light source colors are "high" and the degree of reliability of the second estimated light source color is "low". In the example of FIG. 7C, all the degrees of similarity of the first to third estimated light source colors in FIG. 8 are "low", and the degree of similarity calculation unit 208 determines that the degrees of reliability of the first to third estimated light source colors are "neutral".

In step S406, the degree of similarity calculation unit 208 determines whether the present processing is intended to capture the first frame after power-on of the imaging apparatus 100.

If the present processing is intended to capture the first frame (YES in step S406), the processing proceeds to step S407. In step S407, the degree of similarity calculation unit 208 stores the degrees of reliability of the first to third estimated light source colors calculated by the processing so far and the R/G and B/G values of the estimated light source colors into the primary storage device 104.

In step S408, the color mixing unit 209 performs color mixing processing based on the degrees of reliability of the first to third estimated light source colors. Details of the color mixing processing by the color mixing unit 209 will now be described.

The degrees of reliability of the estimated light source colors are expressed in terms of "high", "neutral", and "low" as illustrated in the correspondence table of FIG. 8.

If any of the first to third estimated light source colors has a degree of reliability "high", the color mixing unit 209 mixes the estimated light source colors by Eqs. (2) to be described below, with the weight assigned to the estimated light source color(s) having the degree of reliability "high" as 100%, and the weight assigned to the estimated light source color(s) having the other degrees of reliability ("neutral" and "low") as 0%.

If none of the first to third estimated light source colors has a degree of reliability "high" or "neutral" but all the first to third estimated light source colors have a degree of reliability "low", the color mixing unit 209 uses a mixed light source color obtained in capturing the previous frame. Note that the imaging apparatus 100 according to the present exemplary embodiment is controlled so that the degrees of reliability of the first to third estimated light source colors are not set to "low" in capturing the first frame after power-on.

In the present exemplary embodiment, determination errors in the estimated light source colors can thus be determined by comparing the relationship between the distances between the respective estimated light source colors.

$$R/G0=(R/G1 \times a + R/G2 \times b + R/G3 \times c)/(a+b+c), \text{ and}$$

$$B/G0=(B/G1 \times a + B/G2 \times b + B/G3 \times c)/(a+b+c) \quad \text{Eqs. (2)}$$

R/G0 in Eqs. (2) is the R/G value after the color mixing processing, and B/G0 the B/G value after the color mixing processing. R/G1 and B/G1 in Eqs. (2) are the R/G and B/G values of the first estimated light source color, R/G2 and B/G2 the R/G and B/G values of the second estimated light source color, and R/G3 and B/G3 the R/G and B/G values of the third estimated light source color. In Eqs. (2), a is the weight to the R/G and B/G values of the first estimated light source color, b the weight to the R/G and B/G values of the second estimated light source color, and c the weight to the R/G and B/G values of the third estimated light source color.

The color mixing unit 209 stores R/G0 and B/G0 of the light source color calculated here into the primary storage device 104 for use in subsequent frames. While in the present exemplary embodiment the color mixing unit 209 performs the color mixing processing based on the degrees of reliability, the color mixing unit 209 may perform color mixing processing based on the degrees of similarity.

In step S409, the correction value calculation unit 210 calculates the WB correction values from the R/G and B/G values (R/G0 and B/G0) of the light source color after the color mixing processing calculated in step S408 by using the following Eqs. (3):

$$Wr=1/(R/G0),$$

$$Wg=1, \text{and}$$

$$Wb=1/(B/G0) \quad \text{Eqs. (3)}$$

In Eqs. (3), Wr is the WB correction value for the R value, Wg the WB correction value for the G value, and Wb the WB correction value for the B value. R/G0 is the R/G value after the color mixing processing, and B/G0 the B/G value after the color mixing processing.

The calculation processing of the WB correction values by the correction value calculation unit 210 ends.

Now, processing for the case where the present processing is determined to be intended to capture the second or a subsequent frame after the power-on of the imaging apparatus 100 in step S406 will be described.

If the processing is determined to be intended to capture the second or a subsequent frame after the power-on of the imaging apparatus 100 in step S406 (NO in step S406), the processing proceeds to step S410.

In step S410, the degree of similarity calculation unit 208 recalculates the degrees of reliability of the first to third estimated light source colors based on comparison results of the degrees of reliability of the first to third estimated light source colors between the latest frame and a past frame.

Specifically, the degree of similarity calculation unit 208 compares the R/G and B/G values of the first to third estimated light source colors determined in the latest frame with those in a past frame. If differences of the foregoing distances between the positions of the R/G and B/G values of the first to third estimated light source colors obtained in the latest frame from those in the past frame fall within a predetermined value, the degree of similarity calculation unit 208 recalculates the degrees of reliability and the estimated light source colors as in the table illustrated in FIG. 9. If the distances between the positions of the R/G and B/G values of the estimated light source colors in the latest frame differ from those in the past frame by more than the predetermined value, the degree of similarity calculation unit 208 uses the degrees of reliability and the estimated light source colors determined in the latest frame as the recalculated degrees of similarity and the recalculated estimated light source colors.

Details of the table illustrated in FIG. 9 will now be described.

As a basic operation in FIG. 9, the degree of similarity calculation unit 208 recalculates the degrees of reliability and the estimated light source colors with higher priority to the degrees of reliability calculated from the latest frame. If a degree of reliability calculated from the latest frame is "neutral", the degree of similarity calculation unit 208 recalculates the degree of reliability and the estimated light source color with higher priority given to the degree of reliability calculated from the past frame. If both the degrees of reliability calculated in the past frame and the latest frame are "neutral", the degree of similarity calculation unit 208 uses the degree of reliability and the estimated light source color in the latest frame as the recalculation result.

As described above, in the present exemplary embodiment, the degrees of reliability and the estimated light source colors are recalculated based on the comparison results of the distances (degrees of similarity) between the positions of the R/G and B/G values and the degrees of reliability of the estimated light source colors calculated in the latest frame with those calculated in the past frame. More specifically, in the present exemplary embodiment, at least one of the degrees of similarity and the degrees of reliability of the first, second, and third estimated light source colors is compared with the same type of result obtained in capturing the next or a subsequent frame. The WB correction values for the image of the next or subsequent frame are calculated based on the comparison result. Whether the estimated light source colors are erroneous can thus be determined even if the degrees of reliability calculated in the latest frame are determined to be "neutral".

Now, suppose that when the degree of similarity calculation unit 208 determines whether the present processing is intended to capture the second or a subsequent frame after the power-on of the imaging apparatus 100 in step S406, a predetermined time has elapsed or the brightness of an object calculated by the photometric sensor 105 has changed by a predetermined value or more since the previous frame. In such a case, the reliability of past frame information drops. The degree of similarity calculation unit 208 may therefore be configured to process the current frame as the first frame without using information obtained from the previous frame in at least either one of the cases where the predetermined time has elapsed and where the brightness has changed by the predetermined value or more.

As described above, according to the present exemplary embodiment, the effect of erroneous WB corrections due to misdetection of objects can be reduced by automatic WB calculation using specific object detection. This enables appropriate WB control and can prevent automatic WB accuracy from dropping.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-086873, filed May 18, 2020, which is hereby incorporated by reference herein in its entirety.

What is claimed is:

1. An image processing apparatus comprising one or more processors configured to function as following units:
    a detection unit configured to detect two or more specific objects from a captured image;
    a first color estimation unit configured to estimate a first light source color from color information about a first specific object among the detected specific objects;
    a second color estimation unit configured to estimate a second light source color from color information about a second specific object among the detected specific objects;
    a third color estimation unit configured to estimate a third light source color from color information about an area including other than the detected specific objects; and
    a calculation unit configured to calculate a white balance correction value to be applied to the captured image by assigning a weight to at least one of the first, second, and third light source colors based on degrees of similarity between the first, second, and third light source colors.

2. The image processing apparatus according to claim 1, wherein the calculation unit is configured to calculate degrees of reliability of the respective first, second, and third light source colors based on the degrees of similarity between the first, second, and third light source colors, and calculate the white balance correction value by assigning the weight(s) based on the degrees of reliability.

3. The image processing apparatus according to claim 2, wherein the calculation unit is configured to:
    determine whether the degrees of similarity between the first, second, and third light source colors are high or low by comparing the degrees of similarity with a predetermined value,
    in a case where each of the degrees of similarity between the first, second, and third light source colors is determined to be high, determine that the degrees of reliability of the first, second, and third light source colors are high,
    in a case where only one degree of similarity is determined to be low, determine that a degree of reliability of a light source color corresponding to the one degree of similarity determined to be low is low, and
    in a case where each of the degrees of similarity between the first, second, and third light source colors is determined to be low, determine that the degrees of reliability of the first, second, and third light source colors are neutral.

4. The image processing apparatus according to claim 3, wherein the calculation unit is configured to calculate the white balance correction value based on a light source color obtained by performing mixing processing on the first, second, and third light source colors after the weight(s) is/are assigned.

5. The image processing apparatus according to claim 4, wherein the calculation unit is configured to perform the mixing processing with the weight(s) to a light source color or colors of which the degree(s) of reliability is(are) determined to be high among the first, second, and third light source colors as 100% and the weight(s) to a light source color or colors of which the degree(s) of reliability is(are) not determined to be high as 0%.

6. The image processing apparatus according to claim 4, wherein the calculation unit is configured to, in a case where none of the degrees of reliability of the first, second, and third light source colors are determined to be high and each of the degrees of reliability of the first, second, and third light source colors are determined to be neutral or low, perform the mixing processing with the weight(s) to a light source color or colors of which the degree(s) of reliability is(are) determined to be neutral as 100% and the weight(s) to a light source color or colors of which the degree(s) of reliability is(are) not determined to be neutral as 0%.

7. The image processing apparatus according to claim 4, wherein the calculation unit is configured to, in a case where none of the degrees of reliability of the first, second, and third light source colors are determined to be high or neutral and each of the degrees of reliability of the first, second, and third light source colors is determined to be low, use information about the white balance correction value calculated based on a light source color obtained by the mixing processing on a captured image of a previous frame.

8. The image processing apparatus according to claim 7, wherein the calculation unit is configured to, in at least either one of cases where a predetermined time has elapsed and where brightness of a specific object has changed by a predetermined value or more since capturing of the image of the previous frame, not use the information obtained in the previous frame.

9. The image processing apparatus according to claim 2, wherein the calculation unit is configured to make a comparison between information about at least one of the first, second, and third light source colors, the degrees of similarity between the first, second, and third light source colors, and the degrees of reliability of the first, second, and third light source colors and a same type of information obtained by capturing an image of a next or subsequent frame, and calculate the white balance correction value for the image of the next or subsequent frame based on a result of the comparison.

10. The image processing apparatus according to claim 1, wherein the detection unit is configured to detect at least two or more of objects including a face, skin, plant green, a blue sky, a cloud, ground, a tree trunk, asphalt pavement, an autumn leaf, and a dead leaf as the specific objects from the captured image.

11. The image processing apparatus according to claim 1, wherein the third color estimation unit is configured to estimate the third light source color from color information about a white area included in the area including other than the specific objects.

12. An image processing method comprising:
   detecting two or more specific objects from a captured image;
   estimating a first light source color from color information about a first specific object among the detected specific objects;
   estimating a second light source color from color information about a second specific object among the detected specific objects;
   estimating a third light source color from color information about an area including other than the detected specific objects; and
   calculating a white balance correction value to be applied to the captured image by assigning a weight to at least one of the first, second, and third light source colors based on degrees of similarity between the first, second, and third light source colors.

13. A non-transitory computer-readable storage medium storing a program for causing a computer to execute following steps comprising:
   detecting two or more specific objects from a captured image; estimating a first light source color from color information about a first specific object among the detected specific objects;
   estimating a second light source color from color information about a second specific object among the detected specific objects;
   estimating a third light source color from color information about an area including other than the detected specific objects; and
   calculating a white balance correction value to be applied to the captured image by assigning a weight to at least one of the first, second, and third light source colors based on degrees of similarity between the first, second, and third light source colors.

* * * * *